United States Patent [19]
Siegmund

[11] 3,989,495
[45] Nov. 2, 1976

[54] METHOD OF MAKING OPTICAL PRISMS
[75] Inventor: Walter P. Siegmund, Woodstock, Conn.
[73] Assignee: American Optical Corporation, Southbridge, Mass.
[22] Filed: July 10, 1975
[21] Appl. No.: 594,825

[52] U.S. Cl. .................................. 65/31; 65/38; 65/61; 350/320
[51] Int. Cl.² .................. C03C 15/00; C03C 19/00
[58] Field of Search .............. 65/61, 38, 37, 31; 350/320

[56] References Cited
UNITED STATES PATENTS

| | | | |
|---|---|---|---|
| 3,455,667 | 7/1969 | Snitzer et al. | 65/38 X |
| 3,455,668 | 7/1969 | Upton | 65/38 |
| 3,879,182 | 4/1975 | Strack | 65/37 |
| 3,926,601 | 12/1975 | Hicks, Jr. | 65/31 |

Primary Examiner—S. Leon Bashore
Assistant Examiner—Frank W. Miga
Attorney, Agent, or Firm—H. R. Berkenstock, Jr.; William C. Nealon

[57] ABSTRACT

Making an optical prism of an enlarged ground and polished insoluble glass preform encased with soluble glass. The glass combination is heated and drawn to the reduced cross-sectional size desired of the prism with the soluble glass protecting the prism preform against deformation by surface tension forces and other damage. The soluble glass is removed after drawing to leave the prism body with true faces and angles.

5 Claims, 10 Drawing Figures

METHOD OF MAKING OPTICAL PRISMS

BACKGROUND OF THE INVENTION

1. Field of the Invention

This invention relates to the manufacture of light-refracting optical components with particular reference to the manufacture of prisms.

2. Description of the Prior Art

Optical prisms are conventionally made by grinding and polishing directly from optical glass either in block form or in molded blanks. This involves tedious, time-consuming and difficult operations often requiring exceptional skills. For example, considerable difficulty and tediousness can be experienced in grinding and polishing prisms of very small cross-sectional size and/or of the long and slender type needed in scanning devices, i.e. where a long line or strip of information must be imaged through the prism.

Difficulties in the grinding and polishing of prism faces to precision flatness and angle, which in all cases are none too few, become compounded with requirements for prism size reduction and/or slenderizing. Workpiece handling, holding and breakage problems have heretofore increased with size reduction requirements as have difficulties in maintaining product quality.

It is with the foregoing matters in view that the present invention is directed toward overcoming drawbacks of prior art practices relating to the manufacture of optical prisms in general and more particularly to those of relatively small cross-sectional size and/or of long and slender configuration. Accordingly, a principal object of the invention is to improve upon prior art methods of making optical prisms and, more particularly, to provide greater ease, economy and precision in prism manufacture.

SUMMARY OF THE INVENTION

The foregoing object and its corollaries are accomplished by preparing a large easily handled and readily workable prism preform which is constructed of an insoluble glass preselected to have desired refractive index properties.

Surfaces of the preform are ground and polished to exact predetermined specifications of relative widths, angle and sharpness of edge desired of facets of the finished prisms. These ground and polished surfaces are encased with a protective soluble glass by fusing one or more blocks of such glass thereto.

The resulting glass boule is heated and drawn longitudinally to an extent where at least a portion of the length of the prism preform becomes reduced to the cross-sectional size desired of a finished prism, the encasing soluble glass protecting and preserving surface finish and edge sharpness of the drawn preform.

The drawn portion of the boule is next cut transaxially to a desired finished length or number of lengths of prism and, finally, the soluble glass is removed from the cut length or lengths. This exposes facets of the remaining insoluble glass as prism faces having widths and edge sharpnesses corresponding in relative proportion and acuteness to the original ground and polished surfaces of the preform.

Details of the invention will become more readily apparent from the following description when taken in conjunction with the accompanying drawings.

IN THE DRAWINGS

DESCRIPTION OF THE PREFERRED EMBODIMENTS

Figure 1:
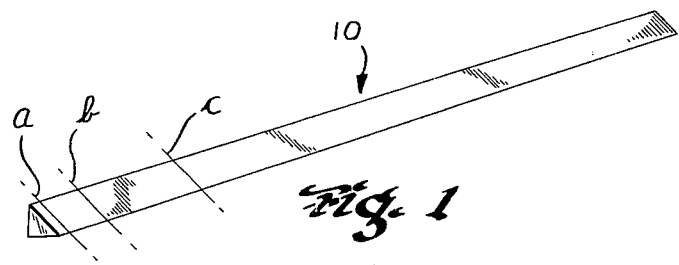
FIG. 1 is an illustration, in perspective, of an optical prism producible according to the invention.

Referring more particularly to FIG. 1, prism 10 is exemplary of a type having special utility in scanning devices where a long line or strip of information is required to be imaged through the prism. The present method of making optical prisms is particularly suited to the manufacture of this type of prism whether of triangular cross-sectional configuration as illustrated or differently shaped.

Prisms of various lengths, e.g. shorter than, equal to or longer than the width of one face of prism 10 may be produced by cutting the prism 10 transaxially at lines $a$, $b$, or $c$ and/or elsewhere along its length. However, it will become apparent as this description progresses that the transaxial cutting can be performed to particular advantage at a stage of the method which precedes completion of the prism 10.

A sequence of method steps which may be used to produce prism 10 according to the invention is illustrated in FIGS. 2–10 and comprises the following:

A block 12 of insoluble glass having the refractive index and other optical properties desired of prism 10 is prepared, e.g. by casting, molding or cutting from a larger block of glass. Optical soda-lime glass, lanthanum crown, short flint or other crown and flint glasses may be used.

The expression "insoluble" as used herein with reference to the glass of block 12 is intended to distinguish this glass from others which may be relatively readily soluble or leachable in hydrochloric acid, for example.

Figure 2:
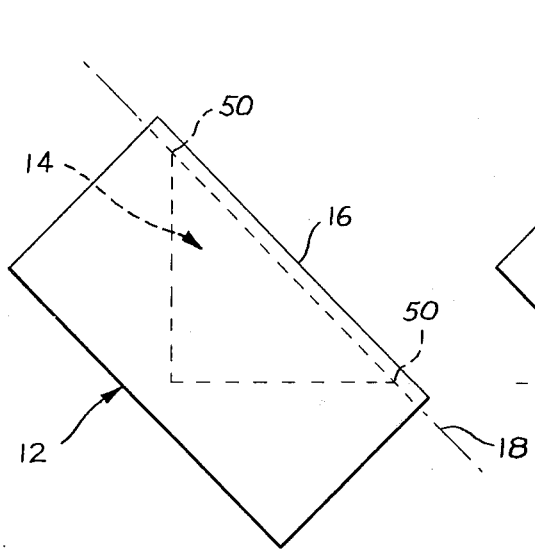
FIGS. 2–10 depict a progression of method steps useful in producing prisms of the type shown in FIG. 1 and illustrate the improved method of the invention.

The cross-sectional size of block 12 is preselected to be such as to permit a preform 14 of the shape desired of prism 10 to be cut therefrom. Broken lines in FIG. 2 illustrate a exemplary shape and a size which is many times larger in cross-section than that desired of prism 10.

The length of block 12 (not shown in FIGS. 2–8 but perceptible in FIG. 9) may be several centimeters, e.g. 50 or more, as determined by the amount or volume of stock required thereof to produce a desired number of drawn prisms.

One side of block 12 is ground and polished to optical perfection, e.g. to the depth of line 18. This grinding and polishing operation and others to be subsequently referred to may, because of the relatively large size of block 12, be accomplished with the convenience, ease and economy of ordinary flat glass grinding and polishing apparatuses (not shown). Such apparatuses in their various forms are well-known to those skilled in the art. In simplest form, they may comprise a flat cast-iron disc which is rotated about its axis and against which the side 16 of block 12 to be ground and polished is pressed while an abrasive or polishing slurry is applied thereto.

The resulting ground and polished surface 20 (FIG. 3) of block 12 is next protected against abuse and/or subsequent distortion by encasement with block 22 of a soluble (i.e. leachable) glass. Block 22 may be formed of a borosilicate glass or other conventional acid leachable silica or silica-free "weathering" glasses which can be conveniently and efficiently leached with hydrochloric acid, for example.

A glass known commercially as Schott LaK-3, sold by Schott Optical Glass, Inc. of Duryea, PA, U.S.A., is exemplary. This glass has a coefficient of thermal expansion and melting temperature which is compatible with ordinary soda-lime glass. Accordingly, Schott LaK-3 and soda-lime glasses are exemplary of a combination useful in practice of the present method; the prism glass (block 12) being soda-lime and the cladding or encasing glass (block 22) being Schott LaK-3. Other useful combinations of glasses will be readily apparent to those skilled in the art.

Figure 3:
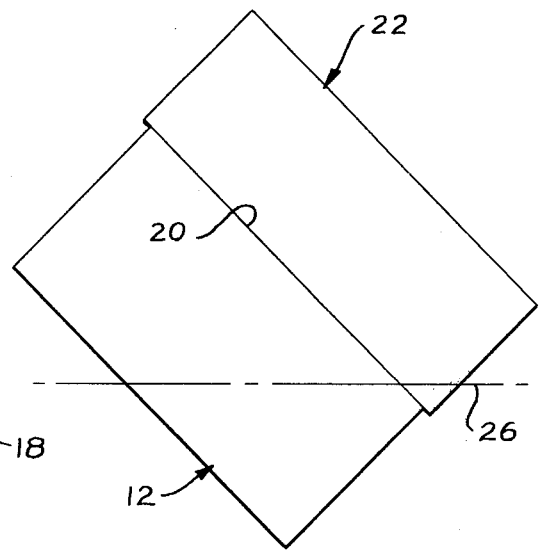
Figure 4:
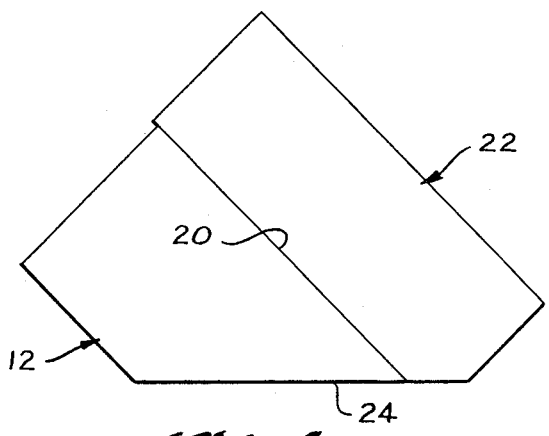
Figure 5:
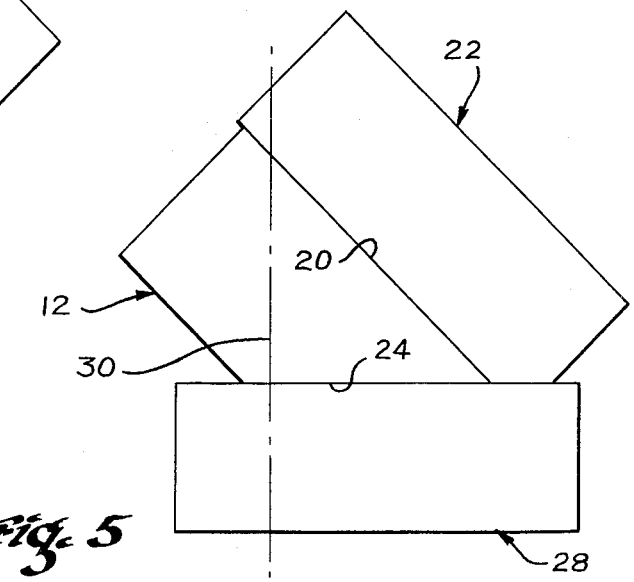

Block 22 is fused to block 12 and a second surface 24 (FIG. 4) of preform 14 is produced by grinding and polishing the assembly of FIG. 3 to the depth of, and along line 26.

A second block 28 of glass similar to that of block 22 is fused to surface 24 (FIG. 5) to encase the ground and polished portion of block 12, i.e. preform 14.

Figure 6:
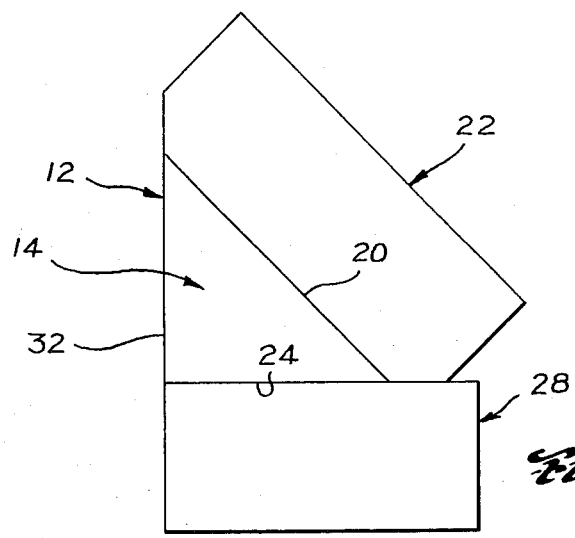

The fused assembly of blocks 12, 22 and 28 (FIG. 5) is ground and polished to the depth of, and along line 30, to produce the optically finished final surface 32 of triangular preform 14 (FIG. 6). The illustrated 45°-90°-45° triangular cross-sectional configuration represents a prism shape regularly used and often required in the art.

A third block 34 (FIG. 7) of a glass similar to blocks 22 and 28 is fused to surface 32 for protection of surface 32 and completion of encasement of preform 14.

Figure 7:
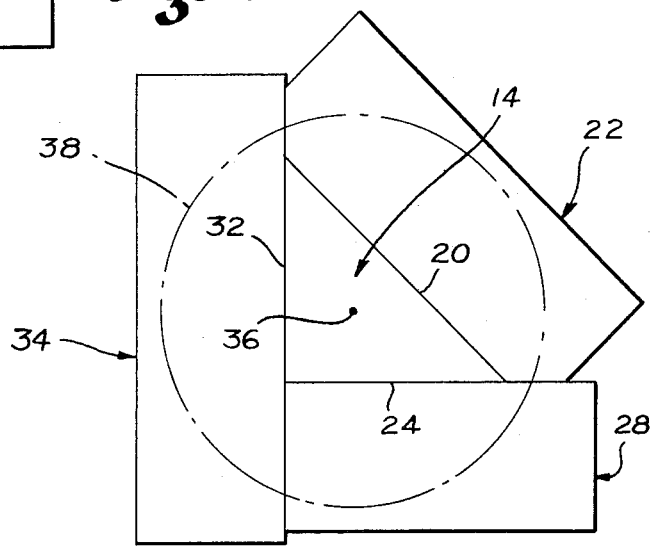
Figure 8:
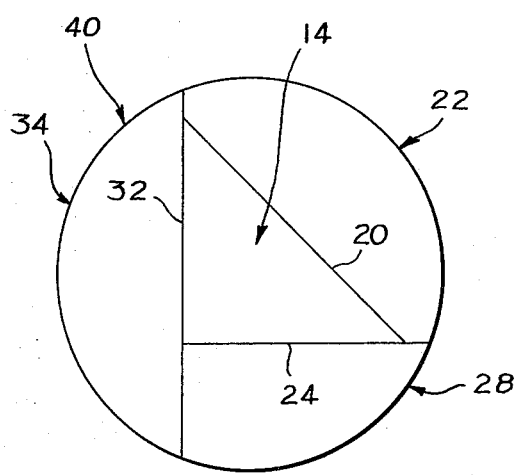
Figure 9:
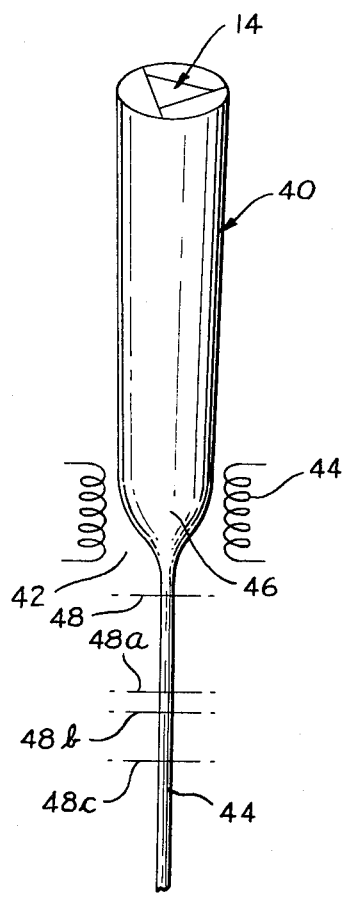
Figure 10:
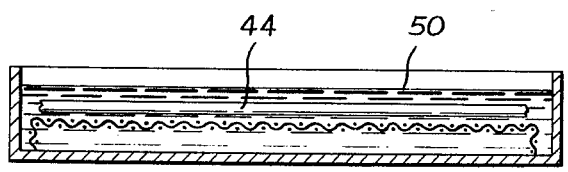

The assembly of FIG. 7 is finally trepanned and/or ground to a cylindrical shape, preferably concentrically about the axis 36 of preform 14 as illustrated by broken line 38. This produces boule 40 (FIG. 8).

Preform 14 having its surfaces 20, 24 and 32 protected by the glasses of blocks 22, 28 and 34 is formed to the final size desired of prism 10 by heating and drawing. To this end, boule 40 is preferably zonally heated progressively from one of its ends toward its other end and drawn longitudinally to a reduced cross-sectional size. The reduced size of boule 40 is controlled to be such that preform 14 is brought to the cross-sectional size desired of prism 10.

With a preform 14 of soda-lime glass encased in LaK-3 glass, a temperature of 700° C in zone 42, produced by suitable heating means 44 such as electrical coils, will render boule 40 readily drawable. Heating zone 42 is moved progressively along boule 40 (e.g. by moving boule 40 relative to coils 44 or vice versa) at a rate keeping pace with removal of material from the boule by the drawing of reduced section 44.

Cutting section 49 transaxially at this stage of the present process, rather than subsequently as discussed hereinabove, offers the advantage of the leachable protective glasses protecting against glass chipping or flaking adjacent edges of the internal prism preform.

Cut lengths of section 49 are lastly immersed in a leaching solution 50, e.g. hydrochloric acid, (FIG. 10) whereupon the encasing leachable glasses are removed. This leaves the drawn insoluble preform as the finished prism, e.g. as prism 10.

By means of the encasement of leachable glasses, surface tension forces ordinarily tending to deform a heated and drawn article are prevented from reaching the internal prism preform. Original sharpness of the prism preform edges, flatness of surfaces, and freedom from blemishing are all preserved.

It is to be understood that in cases where it is only of interest to protect one surface of a preform 14, e.g. surface 20 and/or its edges 50 (FIG. 2), a single encasing block such as 22 may be sufficient.

Under these circumstances, the assembly of blocks 12 and 22 (FIG. 3) may be ground and polished along lines 26 and 30 (FIGS. 3 and 5) without addition of other encasing glasses and thence drawn to the final size desired of a prism or prisms to be produced from block 12. Transaxial cutting and leaching operations would be performed as described hereinabove.

Furthermore, any two of blocks 22, 28 and 34, rather than one or three, may be used to produce a prism according to the invention. The number of encasing glass blocks used may range from only one to at least the number of prism faces produced upon the prism preform. As explained hereinabove, the prism faces may exceed three. Those skilled in the art will readily appreciate that many other modifications of the invention may be made to suit particular requirements without departure from the novel concept disclosed.

I claim:

1. The method of making a miniature optical prism comprising the steps of:
   preparing from a block of insoluble glass a prism preform by grinding and polishing a first flat optical surface on one side of said block;
   fusing a first block of a leachable glass to said first optical surface, said first block of leachable glass extending completely across said first optical surface;
   grinding and polishing a second flat optical surface on another side of said block of insoluble glass and through a portion of said first block of leachable glass;
   fusing a second block of leachable glass to said second flat optical surface, said second leachable block extending completely across said second surface including said portion of said first block of leachable glass;
   grinding and polishing a third flat optical surface on still another side of said block of insoluble glass and through portions of both said first and second blocks of said leachable glasses;
   fusing a third block of leachable glass to said third optical surface, said third leachable block extending completely across said third surface including said portions of said first and second blocks of leachable glass, portions of said first, second and third flat optical surfaces extending across said block of insoluble glass being so relatively angularly disposed as to provide said preform with the cross-sectional shape desired of said prism, said preform being of a substantially greater cross-sectional size than desired of said prism;
   heating and drawing a substantial portion of the unit of said fused blocks of soluble and insoluble glasses to the extent of reducing the cross-sectional size of said preform to that desired of said prism;
   removing said drawn portion from said unit;
   leaching all remaining leachable glasses from said removed portion; and
   at one stage of the method following said step of heating and drawing, cutting said drawn portion of said preform transaxially to the length desired of said prism.

2. The method according to claim 1 wherein said step of transaxially cutting said drawn portion of said preform is performed prior to said step of leaching.

3. The method according to claim 1 wherein said step of transaxially cutting said drawn portion of said preform is performed subsequently to said step of leaching.

4. A method according to claim 1 wherein additional flat optical surfaces are ground and polished across said block of insoluble glass and a corresponding number of additional blocks of soluble glass are fused to said additional surfaces whereby said preform may be given additional cross-sectional configurations.

5. The method according to claim 1 including steps of drawing said portion of said unit to a length greater than that desired of said prism and cutting additional prisms therefrom.

* * * * *